(12) United States Patent
Oh et al.

(10) Patent No.: US 9,774,266 B2
(45) Date of Patent: Sep. 26, 2017

(54) REDUCING OUTPUT VOLTAGE UNDERSHOOT IN ISOLATED POWER CONVERTERS

(71) Applicant: Apple Inc., Cupertino, CA (US)

(72) Inventors: InHwan Oh, Cupertino, CA (US); Bogdan T. Bucheru, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/866,741

(22) Filed: Sep. 25, 2015

(65) Prior Publication Data

US 2016/0094145 A1    Mar. 31, 2016

Related U.S. Application Data

(60) Provisional application No. 62/056,516, filed on Sep. 27, 2014.

(51) Int. Cl.
*H02M 3/335* (2006.01)
*H02M 1/00* (2006.01)

(52) U.S. Cl.
CPC ............ *H02M 3/33523* (2013.01); *H02M 2001/0025* (2013.01)

(58) Field of Classification Search
CPC ......... H02M 3/33523; H02M 3/33553; H02M 3/33507; H02M 2001/0025
See application file for complete search history.

(56) References Cited

U.S. PATENT DOCUMENTS

| 5,387,822 | A | | 2/1995 | Martin-Lopez et al. | |
|---|---|---|---|---|---|
| 5,995,384 | A | * | 11/1999 | Majid | H02M 3/33523 323/902 |
| 6,445,599 | B1 | * | 9/2002 | Nguyen | H02M 3/1584 363/25 |
| 6,788,556 | B2 | * | 9/2004 | Hosotani | H02M 3/3385 363/21.02 |
| 6,813,170 | B2 | * | 11/2004 | Yang | H02M 1/32 323/901 |
| 6,922,345 | B2 | * | 7/2005 | Nishida | H02M 3/3385 363/21.15 |

(Continued)

OTHER PUBLICATIONS

Been, "Design Tutorial: Power-Supply Optocoupler Basics", www.eetimes.com, (Oct. 29, 2007).

(Continued)

*Primary Examiner* — Timothy J Dole
*Assistant Examiner* — Sisay G Tiku
(74) *Attorney, Agent, or Firm* — Blakely Sokoloff Taylor & Zafman LLP

(57) ABSTRACT

A power converter controller controls a power stage to produce a regulated voltage at a converter output node, using an input signal. A circuit uses an opto-coupler circuit that has an input node connected to a compensation circuit, to generate the input signal. The compensation circuit has a shunt regulator having an output that is connected to the opto-coupler circuit through series-connected first and second current limiting elements. An input of the shunt regulator is connected to the converter output node. A feedback element has one end connected between the series-connected current limiting elements and another end connected to the input of the regulator. Other embodiments are also described and claimed.

15 Claims, 7 Drawing Sheets

(56) References Cited

U.S. PATENT DOCUMENTS

| | | | | |
|---|---|---|---|---|
| 6,980,444 B2* | 12/2005 | Takahashi | ......... | H02M 3/33523 363/21.16 |
| 8,102,679 B2 | 1/2012 | Gong et al. | | |
| 8,149,601 B2 | 4/2012 | Xiaowu et al. | | |
| 8,358,517 B2* | 1/2013 | Chiang | ................ | H02M 1/36 323/902 |
| 8,503,196 B2 | 8/2013 | Tai et al. | | |
| 8,717,781 B2 | 5/2014 | Nate | | |
| 8,824,172 B2* | 9/2014 | Chen | ................ | H02M 3/33507 363/21.12 |
| 9,444,345 B2* | 9/2016 | Marchand | ............... | H02M 3/22 |
| 2006/0202562 A1* | 9/2006 | Noguchi | ................ | H02M 1/32 307/112 |
| 2009/0185397 A1* | 7/2009 | Forghani-Zadeh | ..... | H02M 1/36 363/18 |
| 2010/0321957 A1* | 12/2010 | Sha | ................ | H02M 3/33507 363/20 |
| 2011/0018590 A1* | 1/2011 | Tai | ................ | H02M 3/33523 327/103 |
| 2014/0140107 A1 | 5/2014 | Chen et al. | | |
| 2014/0146580 A1* | 5/2014 | Koo | ................ | H02M 3/33523 363/21.17 |
| 2014/0159678 A1* | 6/2014 | Park | ................ | G05F 1/10 323/229 |
| 2014/0177303 A1* | 6/2014 | Goerke | ............ | H02M 3/33507 363/89 |

OTHER PUBLICATIONS onsemi.com, "The TL431 in Switching Power Supplies—English.ppt", hhtp://www.onsemi.com/pub_link/Collateral/TND381-D.PDF, (May 10, 2010).

Texas Instruments, "TLV431xLow-Voltage Adjustable Precision Shunt Regulator", ti.com, (Jul. 1, 1996).

* cited by examiner

REDUCING OUTPUT VOLTAGE UNDERSHOOT IN ISOLATED POWER CONVERTERS

This non-provisional application claims the benefit of the earlier filing date of provisional application No. 62/056,516 filed Sep. 27, 2014.

An embodiment of the invention is directed to techniques for reducing undershoot in the regulated output node of an isolated AC to DC power converter. Other embodiments are also described.

BACKGROUND

A power converter is a circuit that performs electrical power conversion between an input port and an output port by, for example, changing an AC input to a DC output or by changing from a DC input at one level to a DC output at another level. It does so while maintaining the output voltage within a given accuracy specification or range, making it easier for downstream components that are powered by the converter output to operate in a predictable fashion. The converter output voltage, however, exhibits a transient change referred to as undershoot, that is below the lower limit of the voltage accuracy specification, typically when the power converter is loaded abruptly. For example, undershoot occurs when a portable consumer electronics device is unplugged from its AC power adapter and is then plugged in. In addition, a power converter can also exhibit overshoot, which is a transient change in the output voltage that is higher than a specified upper accuracy limit. Overshoot typically occurs when the power converter is abruptly unloaded, e.g. when the AC power adapter output plug is removed from the portable device. Undershoot, especially, is a concern because if severe enough then it may essentially create a brownout situation in which the output voltage drops so much that the downstream components that are powered by the converter can no longer function predictably. Conventional techniques to relieve overshoot and/or undershoot of a switch mode power converter, for example, include using smaller phase inductance and larger filter capacitors in the power stage of the converter.

SUMMARY

It has been discovered that conventional solutions for reducing undershoot do not adequately address, in a practical manner, a wide range of circumstances that are encountered by a power converter, including variations in the size of the load, rapid changes in the load, and temperature variations. In particular, this problem occurs with isolated power converters in which there is a feedback path from the converter output node back to an input of a power converter controller. Typically, the feedback path contains a compensation circuit that includes an opto-coupler circuit, which serves to electrically isolate the converter output node from the power input port of the converter.

In accordance with an embodiment of the invention, a power converter has a controller connected to control a power stage that produces a regulated voltage at a converter output node, using an input signal that is derived through feedback from the output node. A circuit is provided that generates the input signal to the controller, using an opto-coupler circuit whose input node is connected to a compensation circuit. The compensation circuit has a shunt regulator having a) an output that is connected to the input of the opto-coupler circuit through series-connected first and second current limiting elements, and b) an input that is connected to the converter output node. A feedback element that provides feedback to the input of the shunt regulator is connected between the first current limiting element and the second current limiting element. In accordance with another embodiment of the invention, the feedback element that provides feedback to the input of the shunt regulator is connected directly to the output of the shunt regulator. In that embodiment, a diode element connects the output node of the shunt regulator to the converter output node. These embodiments are expected to exhibit reduced undershoot, particularly in a worst-case scenario, for example, when a large load increase occurs during recovery of the output node voltage following an overshoot.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
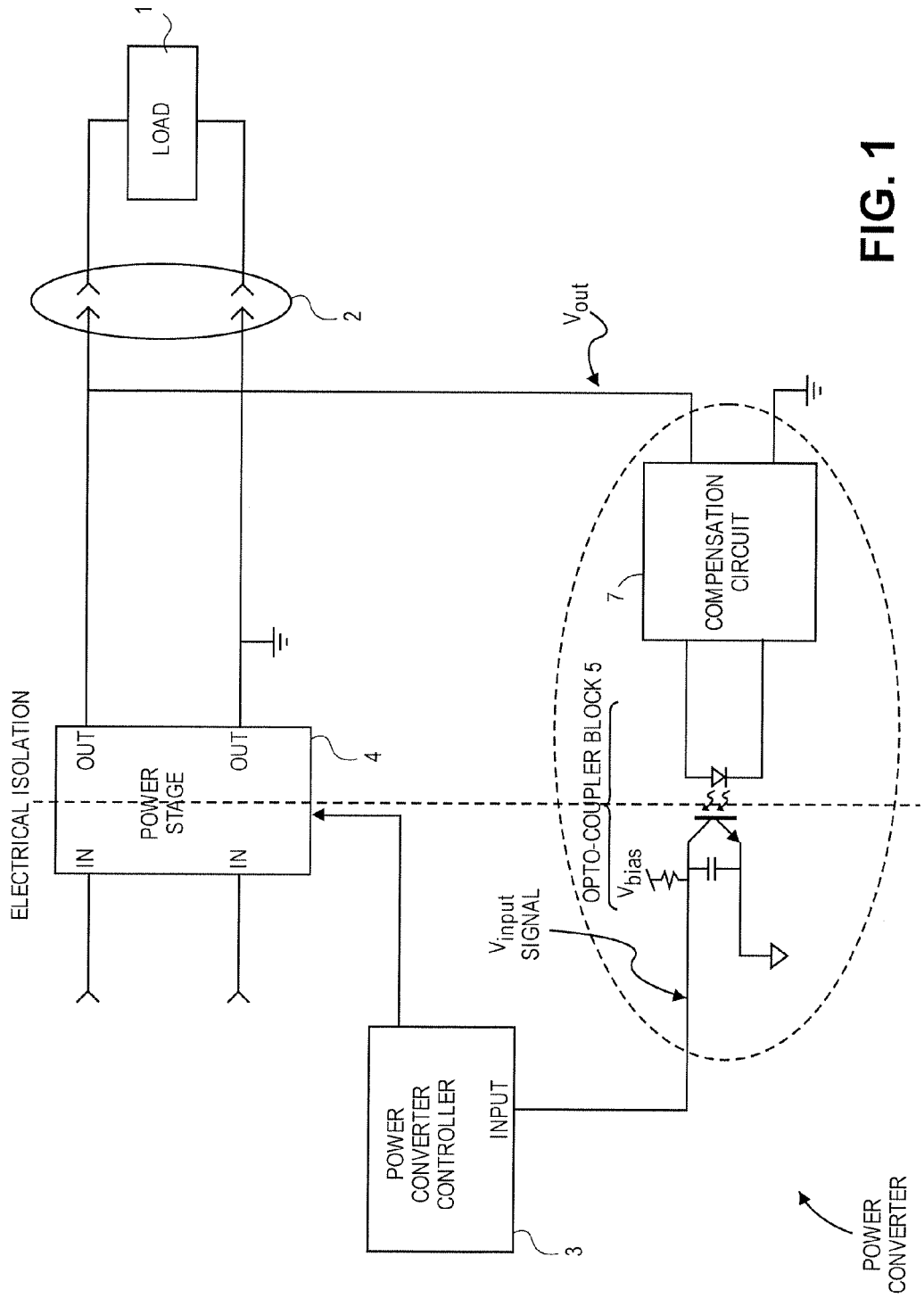
FIG. 1 is a combined circuit schematic and block diagram of an isolated power converter.

Beginning with FIG. 1, this is a block diagram and circuit schematic of an isolated power converter in which an embodiment of the invention can be implemented. The power converter includes a power stage 4 that is controlled by a power converter controller 3, to implement any desired conversion of electrical power, for example, from AC to DC or from DC to DC, which is consumed by a load 1, e.g. system components of a portable (battery powered) electronic device such as a laptop, tablet computer or smartphone. There is electrical isolation through the power stage 4, for example, using a power transformer (not shown). For greater efficiency at high power levels, the power stage 4 may be implemented using active switching devices such as switching power transistors, and the controller 3 would in that case implement any suitable switch mode power supply methodology. For example, in the case of an AC wall power adapter, AC line power is converted to high voltage DC by a rectifier, and then the DC is chopped by power transistors and then fed into a fly back transformer (to provide the isolation) and which outputs low voltage AC, which is then finally converted into DC, once again using a suitable switch mode power topology. Other isolated power converter topologies are possible.

A feedback circuit (depicted by an ellipse in dotted lines) is used to essentially measure the voltage $V_{out}$ at the output node of the power converter and provide an input signal $V_{input}$ to the controller 3. This measure of the output voltage may, for example, be an error signal or other suitable form that reflects the output voltage $V_{out}$. The controller 3 responds to this input signal by adjusting, for example, the switching frequency and/or a duty cycle of the switching power transistors of the power stage 4, in order to obtain the desired (regulated) $V_{out}$ at the output node. The output node of the power converter may be connected to any suitable load 1, including components that make up, for example, a portable consumer electronics device such as a laptop computer, a smartphone, or a tablet computer.

Figure 5:
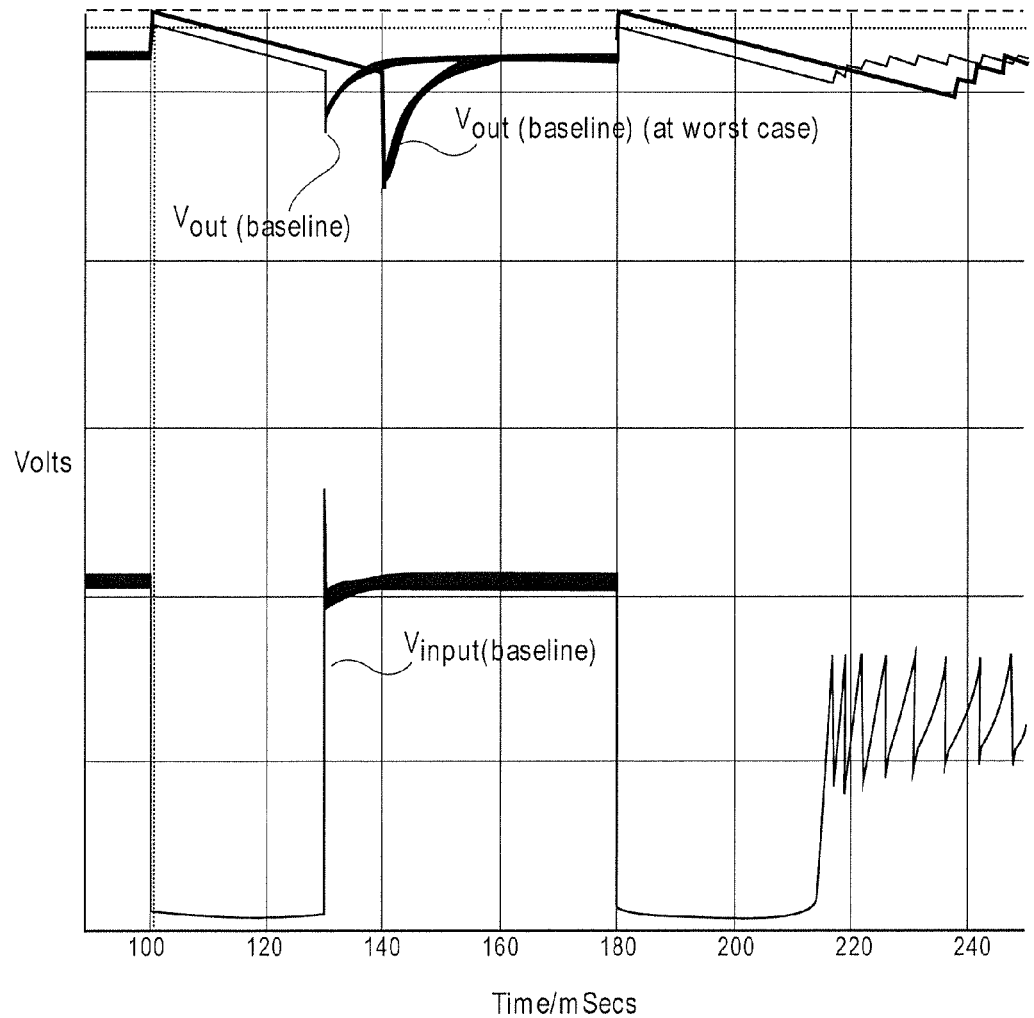
FIG. 5 is a plot of converter output voltage waveforms $V_{out}$ and opto-coupler collector voltage waveforms $V_{input}$ for the baseline approach, and a worst case with the baseline approach, which shows large output voltage undershoot.

The loading of the power converter changes during normal usage, which should be understood to include, for example, the plugging and unplugging of a power adapter connector 2, or any abrupt change in the load 1 that is presented, for example, when a connected laptop computer is transitioned from sleep mode into normal active mode. Those are examples of circumstances in which undershoot can occur in $V_{out}$. It should also be noted that when there is an abrupt removal or reduction of the load (referred to here as "unloading"), such as through a disconnection of the power adapter connector 2 from a portable device or when there is a sudden drop in power consumption within the portable device, $V_{out}$ may exhibit overshoot. FIG. 5 depicts example waveforms showing undershoot and overshoot in $V_{out(baseline)}$. It can be seen that at time marker 100, $V_{out(baseline)}$ jumps from its regulated state upward due to abrupt unloading, and then attempts a recovery back down into the regulated state, but before a complete recovery encounters an abrupt loading at time marker 130 which causes an undershoot.

Still referring to FIG. 1, the power converter has a feedback circuit that generates the input signal to the controller 3 based on the output node voltage $V_{out}$. This circuit includes an opto-coupler block 5 that in part serves to meet the electrical isolation needs of the power converter. The opto-coupler block 5 has a pair of input nodes, at least one of which is connected to a compensation circuit 7. In this case, both input nodes are connected to the compensation circuit 7 as will be described below, although an alternative may be to provide a separate bias current source for the light emitting diode (LED) that is at the input of the opto-coupler block 5.

The compensation circuit 7 serves to operate the feedback input of the power converter controller 3 based on $V_{out}$, in a way that helps stabilize the overall feedback control loop of the power converter so that a stable (and well regulated) $V_{out}$ is achieved over a wide range of circumstances including, for example, component tolerance, temperature variations and load variations. The compensation circuit 7 thus serves to compensate for potential sources of instability in the control loop. In addition, the compensation circuit 7 may serve to produce an error signal for the feedback control loop of the converter, by effectively comparing $V_{out}$ to a reference voltage that sets the regulated output.

Figure 2:
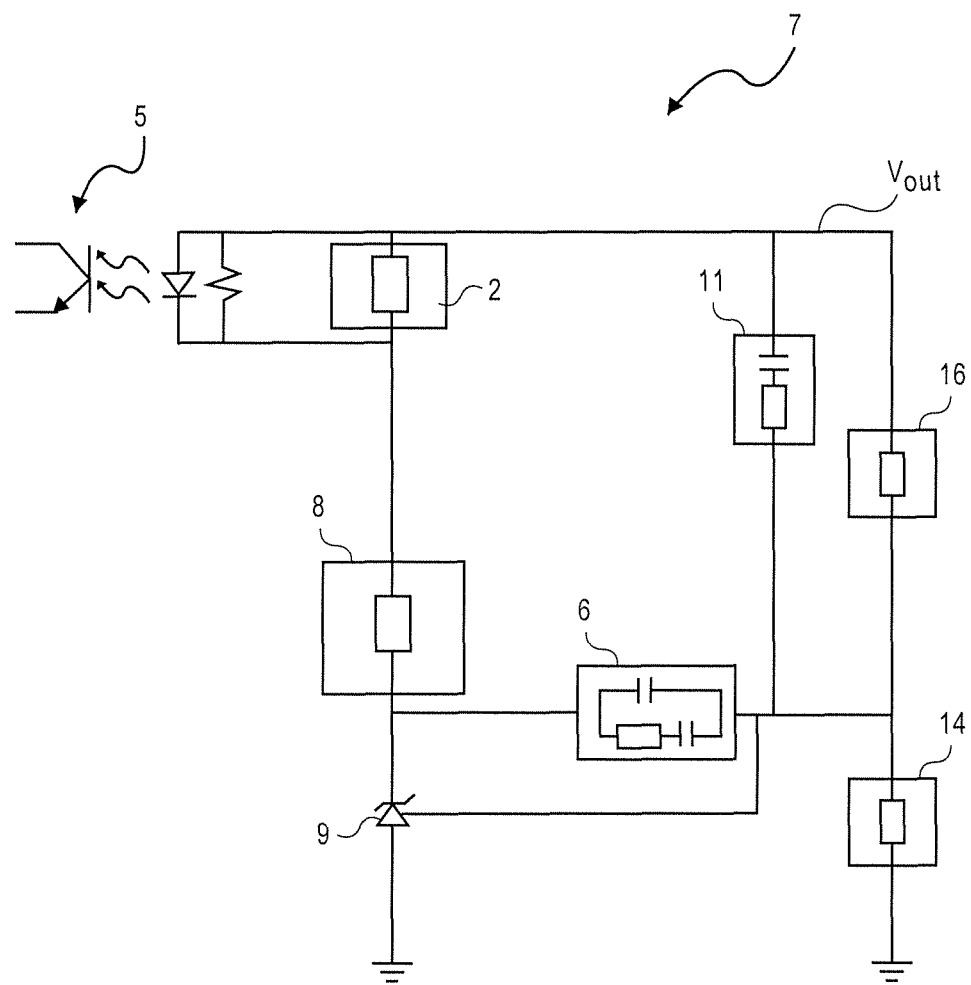
FIG. 2 is a circuit schematic of a baseline compensation circuit that can be used in an isolated power converter.

Turning now to FIG. 2, a baseline design of the compensation circuit 7 is shown. In this case, a shunt regulator 9 (for example, a three terminal linear regulator such as TL431 by TEXAS INSTRUMENTS) has an output that is connected to an input node of the opto-coupler block 5, the latter being connected to a node that joins the current limiting elements 8, 2. Each of the current limiting elements 8, 2 may comprise a network of one or more passive resistors (here, each having a single resistor). The combination of the current limiting elements 8, 2 serve to also provide a bias current through the LED of the opto-coupler 5. This bias current through the LED can be drawn from the output node of the power converter ($V_{out}$) as shown, although as an alternative there may be a separate bias current source (not shown).

The output of the shunt regulator 9 is also connected through a feedback element 6 back to its input node. The feedback element 6 may include a resistor-capacitor (RC) filter circuit that is designed to assist in compensation to stabilize the overall control loop of the power converter, together with a selection of the resistance value of the current limiting element 8. In this example, the first RC filter has two capacitors and a resistor in series with one of the capacitors; other RC filter designs are possible.

There may be other parameters that affect the function of the compensation circuit, in terms of stabilization of the control loop, including the resistance of the element 2 that is connected in parallel with the input LED, and a further element 11 which may be a second RC filter circuit that connects the input of the shunt regulator 9 to the converter output node. In this example, the second RC filter is a series connection of one capacitor and one resistor; other RC filter designs are possible.

The input of the shunt regulator 9 (also referred to sometimes as the "reference" voltage input) needs to sense variation in $V_{out}$. This may be achieved using an appropriate combination of circuit elements that may be, for example, a voltage divider circuit composed of elements 14 and 16 that are connected between $V_{out}$ and ground. This allows the shunt regulator 9 to sense variations in $V_{out}$ while also setting a reference voltage (for purposes of producing an error signal that reflects variation in $V_{out}$.) There may be other ways of connecting the input of the shunt regulator to the converted output node so as to enable the shunt regulator to sense variations in $V_{out}$.

It has been found that the baseline approach depicted in FIG. 2 allows too much undershoot under certain circumstances, including certain combinations of temperature and load—see FIG. 5, $V_{out(baseline)}$ and also $V_{out(baseline)(at\ worse\ case)}$. Various embodiments of the invention are now described that are expected to exhibit less undershoot (even in the worst case circumstances) than the baseline design of FIG. 2.

Figure 3A:
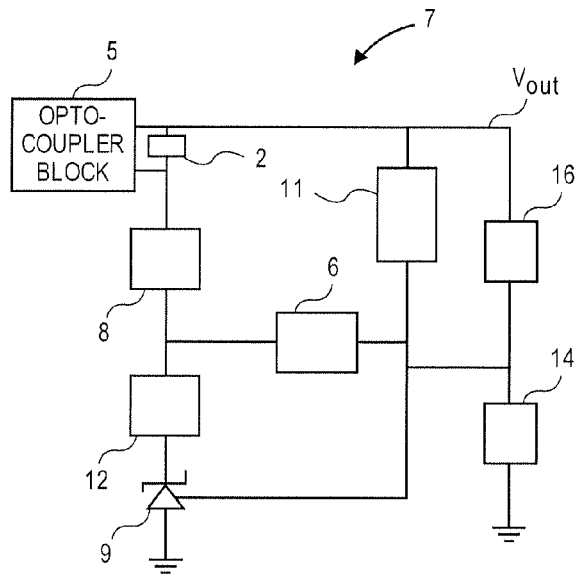
FIG. 3A illustrates a proposed compensation circuit, in accordance with an embodiment of the invention.
Figure 3B:
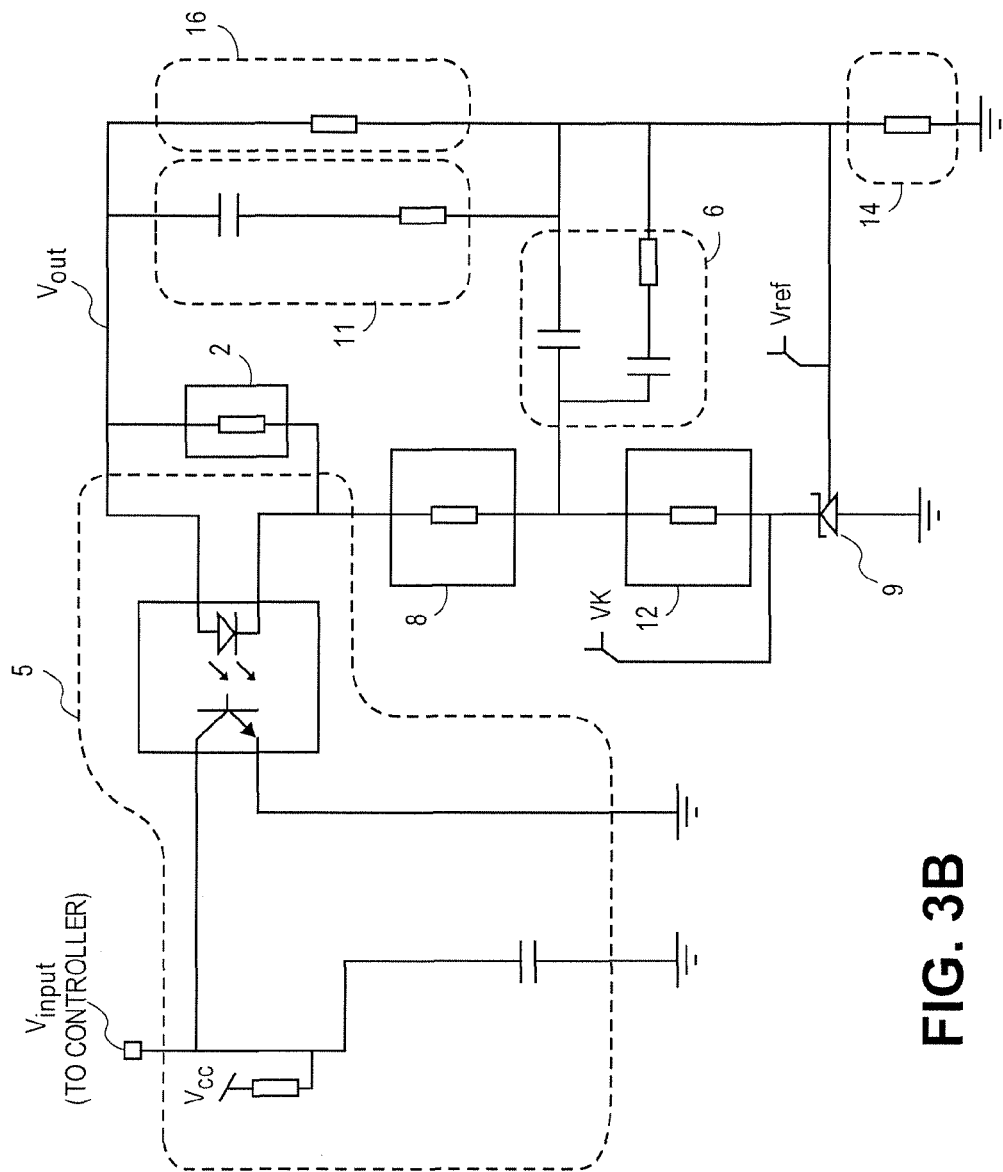
FIG. 3B is one possible implementation of the embodiment of FIG. 3A.

Beginning with FIG. 3A, in this embodiment of the invention, the compensation circuit 7 has elements that may be similar to those of FIG. 2 (having the same reference numbers), except that the arrangement for limiting current through the input LED of the opto-coupler block 5—and biasing of the regulator 9 is modified into current limiting elements 12 and 8 that are connected in series, between the output of the shunt regulator 9 (also referred to sometimes as the "cathode" of a shunt regulator) and the input node of the opto-coupler block 5. The feedback element 6 is now no longer directly connected to the output of the shunt regulator 9, and is connected through the element 12, while still providing feedback to the input of the shunt regulator 9. In other words, the element 6 is now connected between the current limiting elements 12, 8 at one end, and to the shunt regulator input at another end. FIG. 3B shows the embodiment where the current limiting elements 12, 8 are implemented entirely using passive resistors (e.g., a circuit or network of one or more discrete, passive resistors); in another embodiment, one or more of the elements 12, 8 may be implemented using active (three terminal) devices such as an appropriately biased transistor.

Figure 4A:
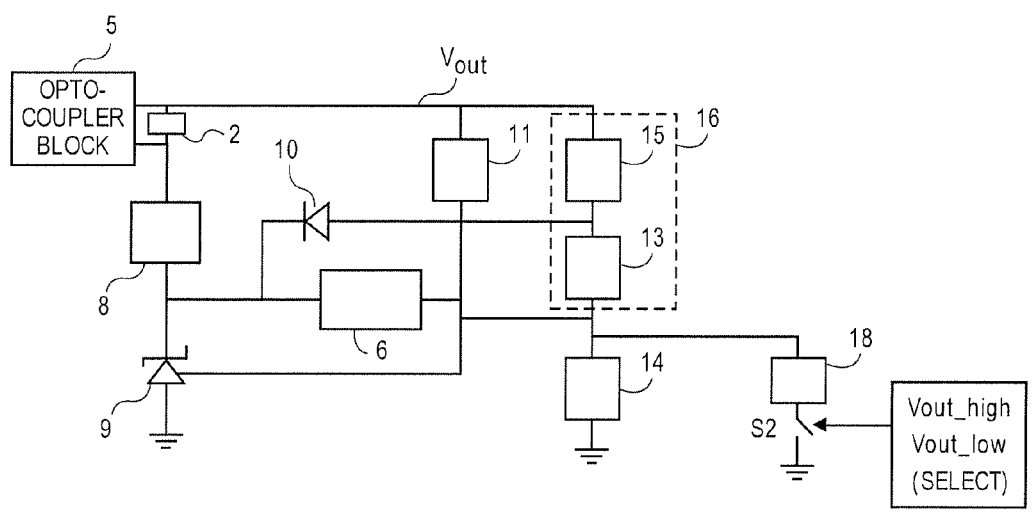
FIG. 4A is another proposed compensation circuit, in accordance with another embodiment of the invention.

Turning now to FIG. 4A, this is another embodiment of the invention in which the compensation circuit 7 once again looks similar in some ways to the baseline approach of FIG. 2, except that a diode element 10 has been added that connects the output node of the shunt regulator 9 to the converter output node ($V_{out}$). In other words, the cathode of the diode element 10 is connected to the cathode terminal of the shunt regulator 9. In this particular case, the connection of the diode element 10 to the output node ($V_{out}$) is through the voltage divider circuit, which has been expanded, relative to the arrangement of elements 14, 16 in FIG. 2, by splitting element 16 into a series connection of element 15 and element 13. This addition of a further "rung" in the resistor ladder allows the anode of the diode element 10 to be connected to the converter output node through a different impedance path, in this case by being connected to the node that joins the two elements 15, 13. To obtain the same converter output voltage ($V_{out}$) in FIG. 4A, as the embodiment of FIG. 3A, the sum of the resistances of the two elements 15, 13 in FIG. 4A should be equal to that of element 16 in FIG. 3A. Thus, the resistance presented by element 15 and the resistance presented by element 13 can be changed relative to each other, while maintaining their sum the same in order to accommodate both the voltage needed at the input of the shunt regulator 9 (for example equal to that of element 16 in FIG. 3B in order to achieve the same $V_{out}$) and a bias for the diode element 10.

Figure 4B:
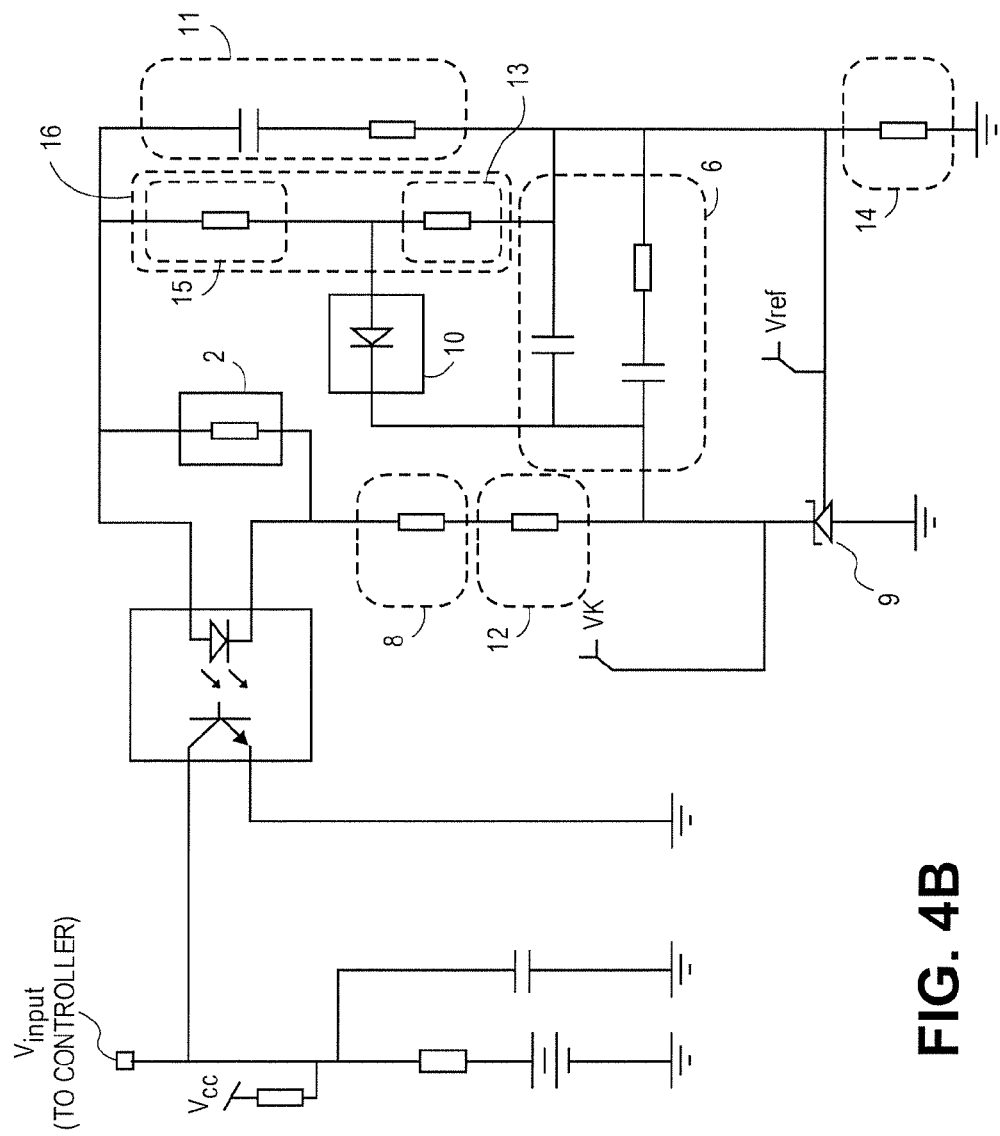
FIG. 4B is an example implementation of the embodiment of FIG. 4A.

FIGS. 3B, 4B show, as examples, variations of the embodiments of FIGS. 3A, 4A, respectively, in which the elements 2, 6, 8, 11, 12, 13, 14, 15, 16 can be implemented using passive elements, namely passive resistors (depicted by small rectangles) and capacitors (depicted by the standard capacitor symbol), and where it should be understood that one of ordinary skill in the art using, for example, computer simulation techniques can select the individual values of the resistances and capacitances so as to achieve the desired control loop stabilization and reduction of undershoot. It is expected that the proposed circuit design, namely that of FIG. 3A and also that of FIG. 4A, will yield a reduction in not just undershoot but also overshoot, especially in worst case scenarios such as the one depicted in FIG. 5 in which the abrupt increase in load at time markers 130, 140 occurs during recovery of the power converter (recovery from a prior abrupt decrease in load at time marker 100). FIG. 5 also shows the behavior of the resulting input signal $V_{input}$ that is produced by a baseline version of the compensation circuit 7.

Figure 6:
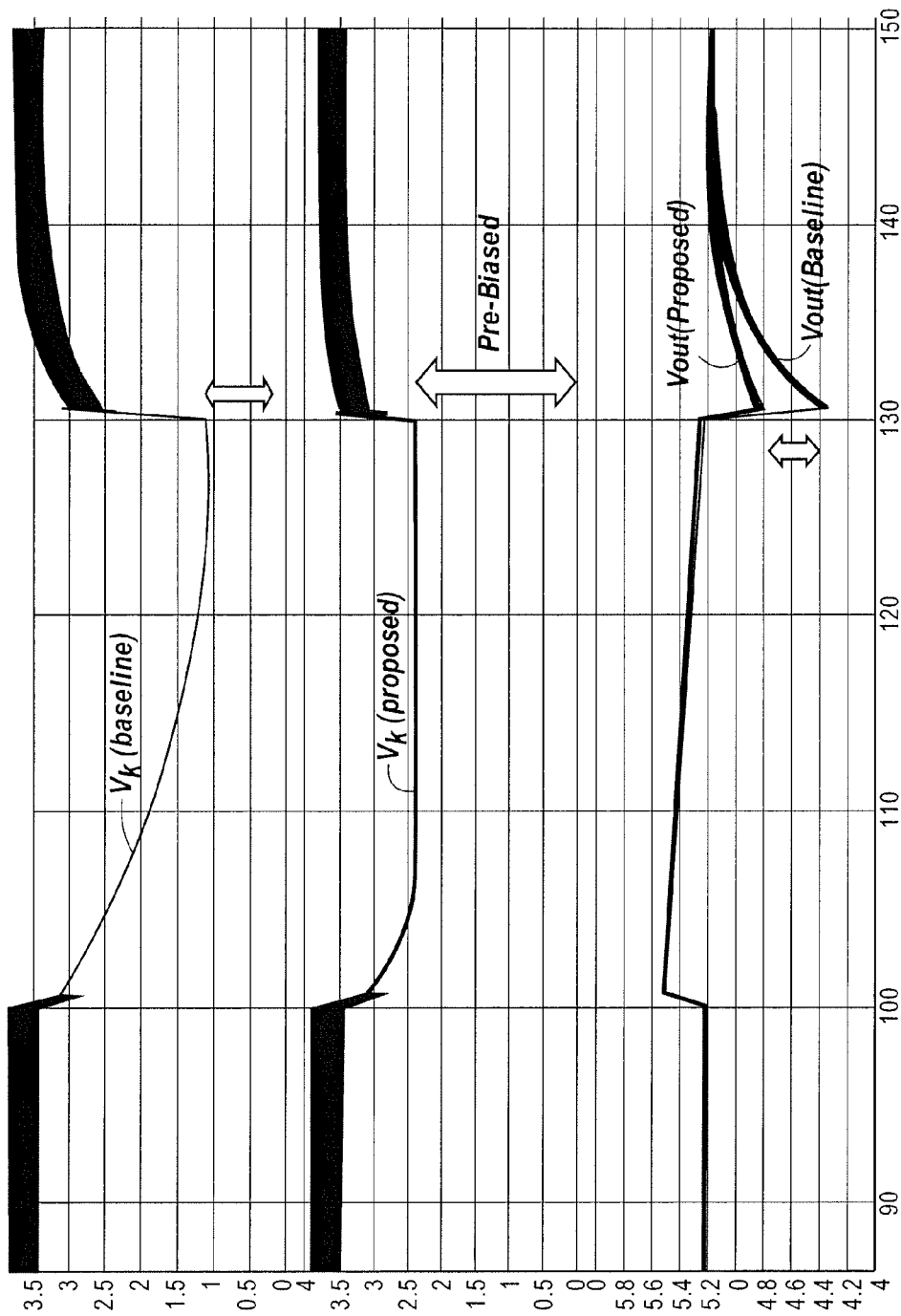
FIG. 6 is a plot of converter output voltages, and shunt regulator output voltage waveforms Vk, for the baseline approach and a proposed approach, depicting a reduction in undershoot that may be a result of the "pre-biased" Vk.

The proposed versions of the compensation circuit 7 described above may enable the controller 3—see FIG. 1—to respond more quickly to changes in load, to thereby yield improved overshoot and undershoot performance. This result may be explained by referring to the waveforms shown in FIG. 6, which show that the undershoot performance improvement of the proposed design may be attributed to the "pre-bias" that is imparted upon the output (cathode) voltage Vk of the shunt regulator 9 (by virtue of either the arrangement in FIG. 3A or the one in FIG. 4A). In other words, the proposed designs do not allow Vk to drop as much as the baseline design, in response to an abrupt decrease in load at time marker 100 in FIG. 6.) As a result, at time marker 130 when there is abrupt increase in load (before $V_{out}$ has fully recovered from the overshoot at time marker 100), $V_{out}$ does not undershoot as severely as in the baseline design.

Referring still to FIG. 4A, this figure is used to illustrate yet another embodiment of the invention, where this embodiment may also be combined with that of FIG. 3A. In particular, FIG. 4A shows an instance of a power converter that has variable output voltage, including the ability to select between a high and a low regulated output voltage, by either asserting or deasserting a control signal that turns on and turns off a switch S2 to thereby change the effective resistance that would otherwise be presented by the element 14 of the voltage divider circuit, which in turn changes the reference voltage Vref at the input of the shunt regulator 9, and which causes the feedback control loop to adjust and yield a different regulated voltage at the power converter output node $V_{out}$.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the switch 2 depicted in FIG. 4A allows two different (regulated) output voltages to be achieved (by changing the reference voltage through the input of the shunt regulator), a different switch arrangement may be used that allows two or more regulated output voltages to be obtained at the converter output node. The description is thus to be regarded as illustrative instead of limiting.

What is claimed is:

1. A power converter comprising:
   a power converter controller configured to control a power stage to produce a regulated voltage at a converter output node using an input signal; and
   a circuit to generate the input signal, wherein the circuit includes an opto-coupler circuit having an input node connected to a compensation circuit, wherein the compensation circuit has
   a shunt regulator having a) an output that is connected to the input node of the opto-coupler circuit through series-connected first and second current limiting elements, and b) an input that is connected to the converter output node, and a feedback element that provides feedback from the output of the shunt regulator to the input of the shunt regulator through the second current limiting element.

2. The power converter of claim 1 wherein the first and second current limiting elements comprise passive resistors.

3. The power converter of claim 1 wherein the feedback element is a first RC filter circuit.

4. The power converter of claim 3 wherein the compensation circuit further comprises a second RC filter circuit that connects the input of the shunt regulator to the converter output node.

5. The power converter of claim 1 wherein the input of the shunt regulator is connected to the converter output node through a voltage divider circuit.

6. The power converter of claim 5 further comprising a switch circuit that is connected to the voltage divider circuit and receives a control signal, wherein the control signal turns on and turns off the switch circuit to thereby change the input signal of the power converter controller, to yield different regulated voltages at the converter output node.

7. The power converter of claim 6 wherein another input node of the opto-coupler circuit is connected to the converter output node to draw an input LED current of the opto-coupler circuit from the converter output node.

8. The power converter of claim 1 wherein another input node of the opto-coupler circuit is connected to the converter output node to draw an input LED current of the opto-coupler circuit from the converter output node.

9. A power converter comprising:
a power converter controller configured to control a power stage to produce a regulated voltage at a converter output node using an input signal; and
a circuit to generate the input signal, wherein the circuit includes an opto-coupler circuit having an input node connected to a compensation circuit, wherein the compensation circuit has a shunt regulator having a) an output that is connected to the input of the opto-coupler circuit through a current limiting element, and b) an input that is connected to the converter output node,
a feedback element that is connected to the output of the shunt regulator and provides feedback to the input of the shunt regulator, and
a diode element that connects a) the output of the shunt regulator and b) the feedback element to the converter output node.

10. The power converter of claim 9 further comprising
a voltage divider circuit, wherein the input of the shunt regulator is connected to the converter output node through an output node of the voltage divider circuit, and the diode element is connected to the converter output node through another output node of the voltage divider circuit.

11. The power converter of claim 10 further comprising a switch circuit that is connected to the voltage divider circuit and receives a control signal, wherein the control signal turns on and turns off the switch circuit to thereby change voltage at the input of the shunt regulator to yield different regulated voltages at the converter output node.

12. The power converter of claim 10 wherein the feedback element is a first RC filter circuit.

13. The power converter of claim 12 wherein the compensation circuit further comprises a second RC filter circuit that connects the input of the shunt regulator to the converter output node.

14. The power converter of claim 12 wherein another input node of the opto-coupler circuit is connected to the converter output node to draw an input LED current of the opto-coupler circuit from the converter output node.

15. The power converter of claim 9 wherein another input node of the opto-coupler circuit is connected to the converter output node to draw an input LED current of the opto-coupler circuit from the converter output node.

* * * * *